US007397029B2

(12) United States Patent
Berkout et al.

(10) Patent No.: US 7,397,029 B2
(45) Date of Patent: Jul. 8, 2008

(54) METHOD AND APPARATUS FOR ION FRAGMENTATION IN MASS SPECTROMETRY

(75) Inventors: Vadym D. Berkout, Rockville, MD (US); Vladimir M. Doroshenko, Ellicott City, MD (US)

(73) Assignee: Science & Engineering Services, Inc., Columbia, MD (US)

( * ) Notice: Subject to any disclaimer, the term of this patent is extended or adjusted under 35 U.S.C. 154(b) by 23 days.

(21) Appl. No.: 11/620,504

(22) Filed: Jan. 5, 2007

(65) Prior Publication Data

US 2007/0114384 A1 May 24, 2007

Related U.S. Application Data

(63) Continuation of application No. 11/126,215, filed on May 11, 2005, now Pat. No. 7,170,051.

(51) Int. Cl.
*B01D 59/44* (2006.01)

(52) U.S. Cl. ....................... 250/288; 250/283; 250/285; 250/293

(58) Field of Classification Search .......... 250/281-300
See application file for complete search history.

(56) References Cited

U.S. PATENT DOCUMENTS

| | | | | |
|---|---|---|---|---|
| 5,420,425 | A | 5/1995 | Bier et al. | |
| 5,464,975 | A | 11/1995 | Kirchner et al. | |
| 6,124,675 | A | 9/2000 | Bertrand et al. | |
| 6,140,638 | A * | 10/2000 | Tanner et al. | 250/282 |
| 6,177,668 | B1 | 1/2001 | Hager | |
| 6,285,027 | B1 | 9/2001 | Chernushevich et al. | |
| 6,723,983 | B2 * | 4/2004 | Holle | 250/287 |
| 2002/0145110 | A1 * | 10/2002 | Holle | 250/287 |
| 2005/0001161 | A1 | 1/2005 | Hiracka | |
| 2005/0272164 | A1 * | 12/2005 | Zhu et al. | 436/86 |
| 2006/0273254 | A1 | 12/2006 | Berkout et al. | |

(Continued)

OTHER PUBLICATIONS

John N. Louris et al, Instrumentation, Applications, and Energy Deposition in Quadrupole Ion-Trap Tandem Mass Spectrometry, Anal. Chem. 1987, vol. 59, pp. 1677-1685.

(Continued)

*Primary Examiner*—Jack I. Berman
*Assistant Examiner*—Andrew Smyth
(74) *Attorney, Agent, or Firm*—Oblon, Spivak, McClelland, Maier & Neustadt, P.C.

(57) ABSTRACT

An apparatus for mass analyzing molecules includes a mass spectrometer configured to select precursor ions having a mass to charge ratio range, a metastable species generator configured to generate a metastable species for introduction into the mass spectrometer, and a mass detector configured to detect a mass of the product ions. The apparatus also includes interaction region in the mass spectrometer where the precursor ions are converted into product ions via interaction of the precursor ions with the metastable species. The mass spectrometer includes at least one of a three-dimensional ion trap, a linear ion trap, or an ion guide. The interaction region is located inside the three-dimensional ion trap, the linear trap, or the ion guide; and at least one of the precursor ions or at least one of the product ions are excited by an alternating electric field or collisionally activated to produce additional product ions.

61 Claims, 5 Drawing Sheets

U.S. PATENT DOCUMENTS

2007/0114384 A1 5/2007 Berkout et al.

OTHER PUBLICATIONS

Roman A. Zubarev et al., Electron Capture Dissociation of Multiply Charged Protein Cations. A Nonergodic Process, J. Am., Chem. Soc. 1998, vol. 120, pp. 3265-3266.

Cris L. Lewis et al., Time-Gated Pulsed Glow Discharge: Real-Time Chemical Speciation at the Elemental, Structural, and Molecular Level for Gas Chromatography Time-Of-Flight Mass Spectrometry, Anal. Chem., May 1, 2003, vol. 75, No. 9, pp. 1983-1996.

Stephen J. Valentine et al., A Database of 660 Peptide Ion Cross Sections: Use of Intrinsic Size Parameters for Bona Fide Predictions of Cross Sections, J. Am. Soc. Mass Spectrom 1999, vol 10, pp. 1188-1211.

* cited by examiner

METHOD AND APPARATUS FOR ION FRAGMENTATION IN MASS SPECTROMETRY

CROSS REFERENCE TO RELATED APPLICATIONS

This application is related to U.S. Ser. No. 11/126,215, the entire contents of which are incorporated herein by reference, and claims priority under 35 U.S.C. § 120 to this application. This patent application is related to U.S. Provisional Ser. No. 60/572,479, the entire contents of which are incorporated herein by reference.

DISCUSSION OF THE BACKGROUND

1. Field of the Invention

The invention relates to procedures and devices for fragmenting ions, preferably biomolecular ions in tandem mass spectrometers.

2. Background of the Invention

Over the last decade, mass spectrometry has played an increasingly important role in the identification and characterization of biochemical compounds in research laboratories and various industries. The speed, specificity, and sensitivity of mass spectrometry make spectrometers especially attractive for rapid identification and characterization of biochemical compounds. Mass spectrometric configurations are distinguished by the methods and techniques utilized for ionization and separation of the analyte molecules. The mass separation process can include techniques for ion isolation, subsequent molecular fragmentation, and mass analysis of the fragment ions. The pattern of fragmentation yields information about the structure of the analyte molecules introduced into the mass spectrometer. The technique of combining ion isolation, molecular fragmentation, and mass analysis is referred to in the art as tandem (or MS/MS) mass spectrometry. MS/MS mass spectrometry is typically implemented as tandem in space (such as triple quadrupole instruments) and tandem in time (such as 3D ion traps) instruments. In tandem in space instruments, precursor ions are selected at a given set of coordinates, and then transferred to different set of coordinates for ion dissociation, and the products are analyzed at yet another set of coordinates. MS/MS in time means that precursor ions are selected at given set of coordinates and then exposed at a later time to dissociation at the same coordinates, followed by yet a later episode of mass analysis at the same coordinates.

One common method for ionizing biomolecules and organic compounds is electrospray ionization (ESI) whereby ions are ionized at atmospheric pressure outside the mass spectrometer via charging, dispersing and evaporating of small droplets. These ions are introduced via atmospheric pressure interface into the vacuum of a mass spectrometer. Matrix assisted laser desorption ionization (MALDI) is another widely used method for ionization of larger biomolecules. In this technique, analytes are mixed with a matrix which absorbs laser irradiation and facilitates ionization. By using pulsed lasers for one-step desorption and ionization, MALDI has application under both reduced pressure and atmospheric pressure conditions.

Fragmentation of ions can be achieved in commercial tandem mass spectrometers through collisionally induced dissociation (CID) with buffer gas molecules in a quadrupole collision cell, as described, for example, in U.S. Pat. No. 6,285,027, the entire contents of which are incorporated herein by reference. In radio frequency ion traps (both three-dimensional and two-dimensional traps), ions can also be fragmented by collisions with a buffer gas. In ion traps, the oscillation of ions to be fragmented can be excited by a bipolar alternating field, as described by Louris, J. N. et al, *Anal. Chem.* 1987, 59: 1677, U.S. Pat. No. 6,177,666 and U.S. Pat. No. 5,420,425, the entire contents of which are incorporated herein by reference. In CID, the energy of collision is quickly redistributed over the large number of vibrational degrees of freedom available in large biomolecules. The energy redistribution causes preferable cleavage of week bonds. Thus, the CID method seldom provides sufficient MS/MS sequence information for proteins larger than 10 kDa. Since the excitation in CID is not specific, the most labile bonds are typically cleaved (which are often a modifying group) and not necessarily the structurally important bonds.

Electron capture dissociation (ECD) is a more recent fragmentation technique that utilizes an ion-electron recombination reaction, as described by Zubarev et al, *J. Am. Chem. Soc.* 1998, 120: 3265-3266, the entire contents of which are incorporated herein by reference. The maximum cross section for the ion-electron interaction is achieved at very low electron energies (e.g., lower than 0.5 eV) and exceeds the collision cross section for interacting with neutrals by about 100 times. To date, ECD has been implemented in ion cyclotron resonance Fourier transform mass spectrometers (ICR-FTMS) with electrons injected directly into ICR cell. Realizing ECD in other types of mass spectrometers has so far been unsuccessful due to the difficulties of introducing low energy electrons into strong and/or varying electrical fields present in ion traps, quadrupole ion guides and sector mass analyzers.

There is a demand for simple and effective ion fragmentation techniques.

SUMMARY OF THE INVENTION

One object of the present invention is to provide an apparatus for interacting ions with metastable species (atoms or molecules) in a mass spectrometer instrument where the ions are labile to dissociate into product ions for analysis.

Another object of the present invention is to provide an apparatus for dissociating ions of biomolecules via interaction with metastable species (atoms or molecules) in a mass spectrometer instrument.

Sill another object of the present invention is to provide an interaction region in a mass spectrometer for interaction of metastable species with analyte molecules to be analyzed.

Yet another object of the present invention is to provide an interaction region in a tandem mass spectrometer for interaction of metastable species with analyte molecules to be analyzed.

Various of these and other objects are provided for in an apparatus for mass analyzing molecules, that includes a mass spectrometer configured to select precursor ions having a mass to charge ratio range, a metastable species generator configured to generate a metastable species for introduction into the mass spectrometer, an interaction region in the mass spectrometer where the precursor ions are converted into product ions via interaction of the precursor ions with the metastable species, and a mass detector configured to detect a mass of the product ions. The mass spectrometer includes at least one of a three-dimensional ion trap, a linear ion trap, or an ion guide. The interaction region is located inside the three-dimensional ion trap or the linear trap or the ion guide; and at least one of the precursor ions or at least one of the product ions are excited by an alternating electric field or collisionally activated to produce additional fragment ions.

It is to be understood that both the foregoing general description of the invention and the following detailed description are exemplary, but are not restrictive of the invention.

BRIEF DESCRIPTION OF THE DRAWINGS

A more complete appreciation of the present invention and many attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
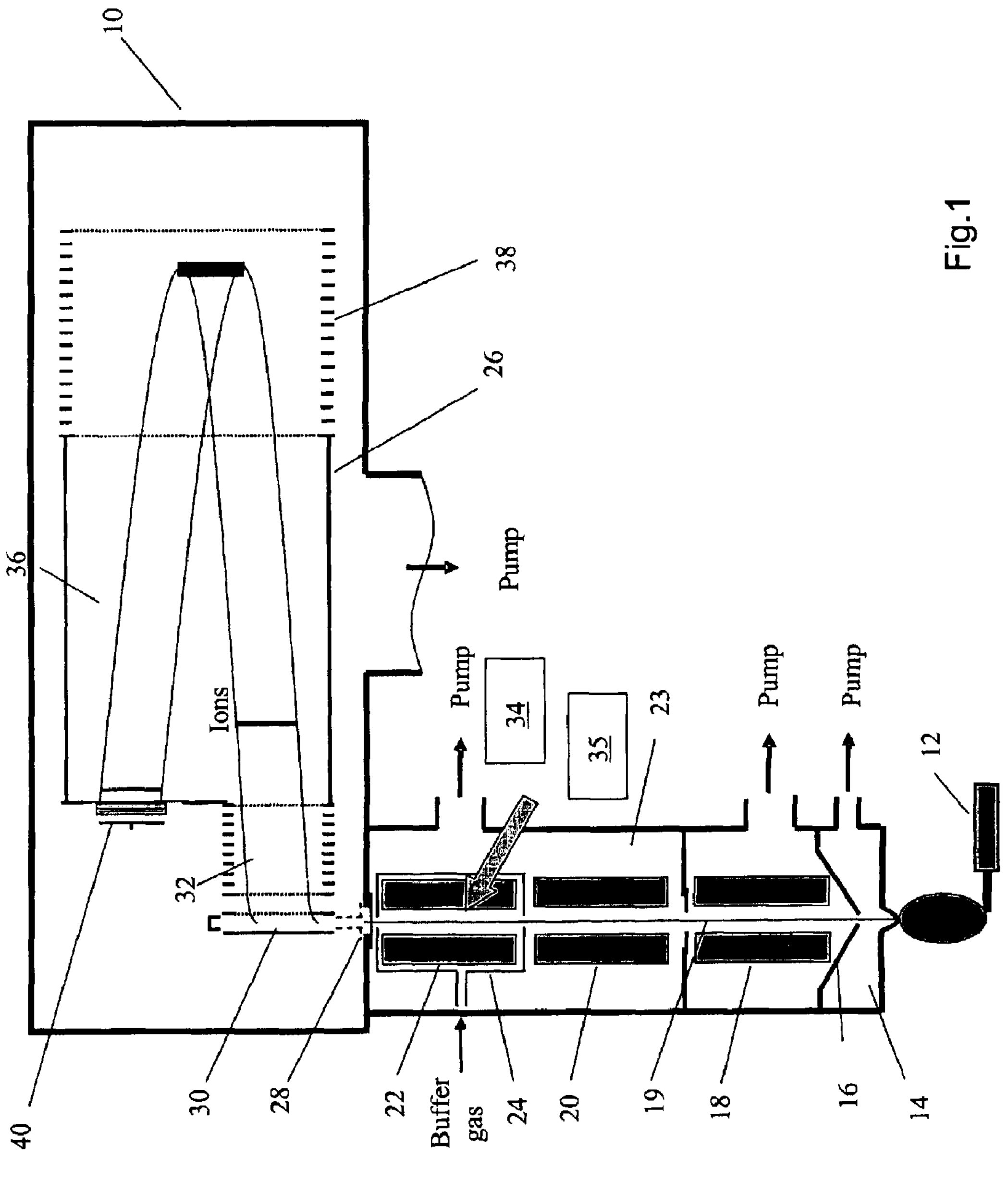
FIG. 1 is a schematic of a QqTOF instrument according to an embodiment of the present invention.

Referring now to the drawings, wherein like reference numerals designate identical, or corresponding parts throughout the several views, and more particularly to FIG. 1, which is a schematic of a quadrupole-quadrupole Time of Flight (QqTOF) instrument 10 according to an embodiment of the present invention. Instrument 10 includes for example an electrospray source 12, although any suitable ion source can be provided. Ions generated in the electrospray source 12 can pass through into a differentially pumped region 14, maintained for example at a pressure of a few Torr, and then can pass through a skimmer 16 and into a first collimating quadrupole 18 operated, for example, in a rf-only mode. Other modes of operation are possible. Quadrupole 18 can be typically operated at a pressure around $10^{-2}$ Torr and can form a collimated ion beam 19. Other operating pressures are possible.

Downstream, chamber 23 includes for example two main ion guide electrode sets as quadrupoles 20 and 22. The downstream chamber 23 can be maintained preferably at a low pressure of approximately $10^{-5}$ Torr or lower. Other pressures are possible. The rod set for quadrupole 20 can be operated in a mass resolving mode to select ions with a particular m/z ratio. Selected ions then pass through into quadrupole 22 and are subject to fragmentation via interaction with metastable species (atoms or molecules in excited electronic or vibronic states). The metastable species can be introduced from a metastable species source 34, to be described in more detail later.

The ion guides described above can generally be of the type known in the art. For example, the ion guides of the present invention can be equally spaced longitudinal rods (round, hyperbolical or rectangular shaped). A typical number of rods can be 4, 6 or 8, although the present invention is not limited to these few electrodes. Radiofrequency voltage of opposite polarity can be applied to adjacent rods (e.g. for sequential set of numbered rod, rods 1, 3, 5, etc. can have an rf sine wave with a 0° phase while rods 2, 4, 6, etc. can have an rf sine wave with a 180° phase). The ion guide electrodes of the present invention can also be axially spaced segments (plates, for example) as described, for example, in U.S. Pat. No. 6,812,453, the entire contents of which are incorporated herein by reference. In that case, the rf voltage of opposite polarity can be applied to adjacent plates in this ion guide set.

A housing 24 around the quadrupole 22 allows, if desired, the addition of a buffer gas at pressures $10^{-3}$-$10^{-2}$ Torr for collisional focusing of product ions. The product ions and any remaining precursor ions can pass through the quadrupole 22 into, for example, a TOF mass analyzer 26 (i.e., a mass detector).

As the ions leave quadrupole rod set 22, the ions can pass through a set of an ion focusing optics 28. A near parallel ion beam can continuously enter an ion storage area 30 of an accelerator 32. Initially the ion storage area 30 can be field-free, so ions continue to move in their original direction. When a pulsed electric field is applied across the ion storage area 30, ions can be deflected in a direction orthogonal to the original trajectory into an accelerating column, and thereby can acquire a final energy. Ions exiting the accelerator 32 can pass a field-free drift region 36 and then can be reflected back in the ion mirror 38. After passing one more time through the field-free drift region 36, the ions can strike a detector 40. The ratio of velocities (determined by electric potentials) can be selected such that ions can reach the detector, without requiring any additional deflection in the drift region.

One alternative to conventional molecular fragmentation using for example CID and ECD, according to an embodiment of the present invention, involves inducing fragmentation by selectively depositing energy into corresponding ion molecular orbitals via interaction with metastable species (i.e., atoms or molecules in electronic or vibronic excited states). Interaction with metastable electronic states of rare gas atoms has been used for ionizing and fragmenting of small molecules in the gas phase, as described for example, in U.S. Pat. No. 6,124,675 and Lewis, C. L. at al, *Anal. Chem.* 2003, 75: 1983-1996, the entire contents of which are incorporated herein by reference.

Fragmentation via interaction with metastable species can be facilitated according to an embodiment the present invention by either introducing metastable species into the region between quadrupoles 20 and 22 or by injecting metastable species inside quadrupole 22. Electron injection can be used to complement the metastable species induced fragmentation. An electron gun 35 as an electron source can inject electrons into the same regions where the metastable species can be introducing. The excitation energies of various noble gases change with atomic weight. For example, the $^3S_1$ and $^1S_0$ states of He are 19.82 eV and 20.61 eV respectively, the $^3P_2$ and $^3P_0$ states of Ar are 11.55 eV and 11.72 eV, and the $^3P_2$ and $^3P_0$ states of Xe are 8.32 eV and 9.45 eV. For nitrogen gas, some more common metastable states are in the range of 8.52 eV to 11.88 eV.

The energy transferred from a metastable species can be sufficient to break molecular bonds. Electron transfer via interaction of metastable levels with high lying molecular orbitals can also facilitate dissociation according to an embodiment of the present invention. Since this flow is neutral, introducing metastable species inside a multipole ion guide of an ion trap or quadrupole mass analyzer can be accomplished without reflection of the metastable species by the voltages existing on the electrodes of the ion guide. Since the metastable species can be long lived (up to few seconds), introduction of the metastable species into a region where the ions are to be fragmented does not require supersonic transport of the metastable species. The above-noted Ar $^3P_2$ and $^3P_0$ electronic states, which are 11.55 eV and 11.72 eV above the ground state, and nitrogen molecules which have electronic and vibronic metastable states in the range of 6.20 eV to 11.88 eV above the ground state, are preferred. However, the present invention is not so limited and other metastable species can be used according to the present invention.

As disclosed in U.S. Pat. No. 6,124,675, a beam of metastable atoms can be generated from a source of rare gas. The rare gas is typically introduced into a chamber having a pressure gradient from its entry to an exit. By applying electrical energy to a cathode and anode, an electric discharge can be generated between the cathode and the anode, thereby extending through the aperture or nozzle into the chamber. The discharge in turn energizes the atoms of the rare gas into a mixture of ions/electrons and metastable atoms in which the electrons of these atoms can be raised to higher energy levels. The stream of metastable atoms, ionized atoms and electrons can then pass through a charged deflector, which removes some of the ions/electrons from the stream of particles. Since the metastable atoms are not charged, the forces applied on the ions and electrons tends to force these particles towards a longitudinal axis extending between the cathode and anode while metastable species are not affected.

Figure 2A:
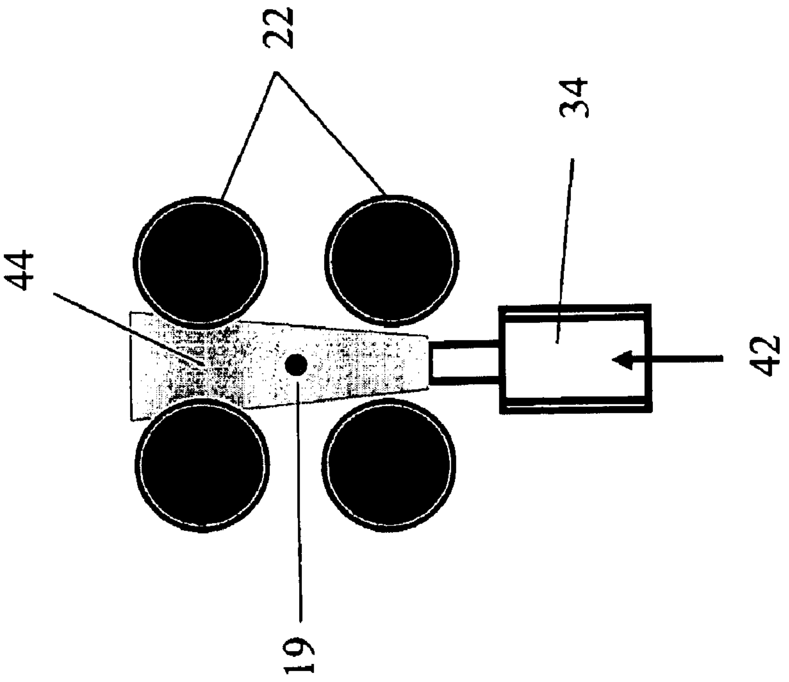
FIG. 2A is a schematic illustration showing one embodiment of the present invention where metastable species of a low kinetic energy are injected into a quadrupole ion guide through an opening between adjacent rods in the quadrupole ion guide.

In one embodiment of the present invention, metastable species can be injected from a metastable species source 34 into a quadrupole ion guide (e.g. inside one or more of quadrupole 18, quadrupole 20, or quadrupole 22) between quadrupole rods, as shown in FIG. 2A. The gas 42 supplied to a source 34 creates in this embodiment an expanding flow which carries metastable species 44 inside the quadrupole ion guide. This low kinetic energy beam of metastable species interacts with ions 19, causing their fragmentation, as described above.

Figure 2B:
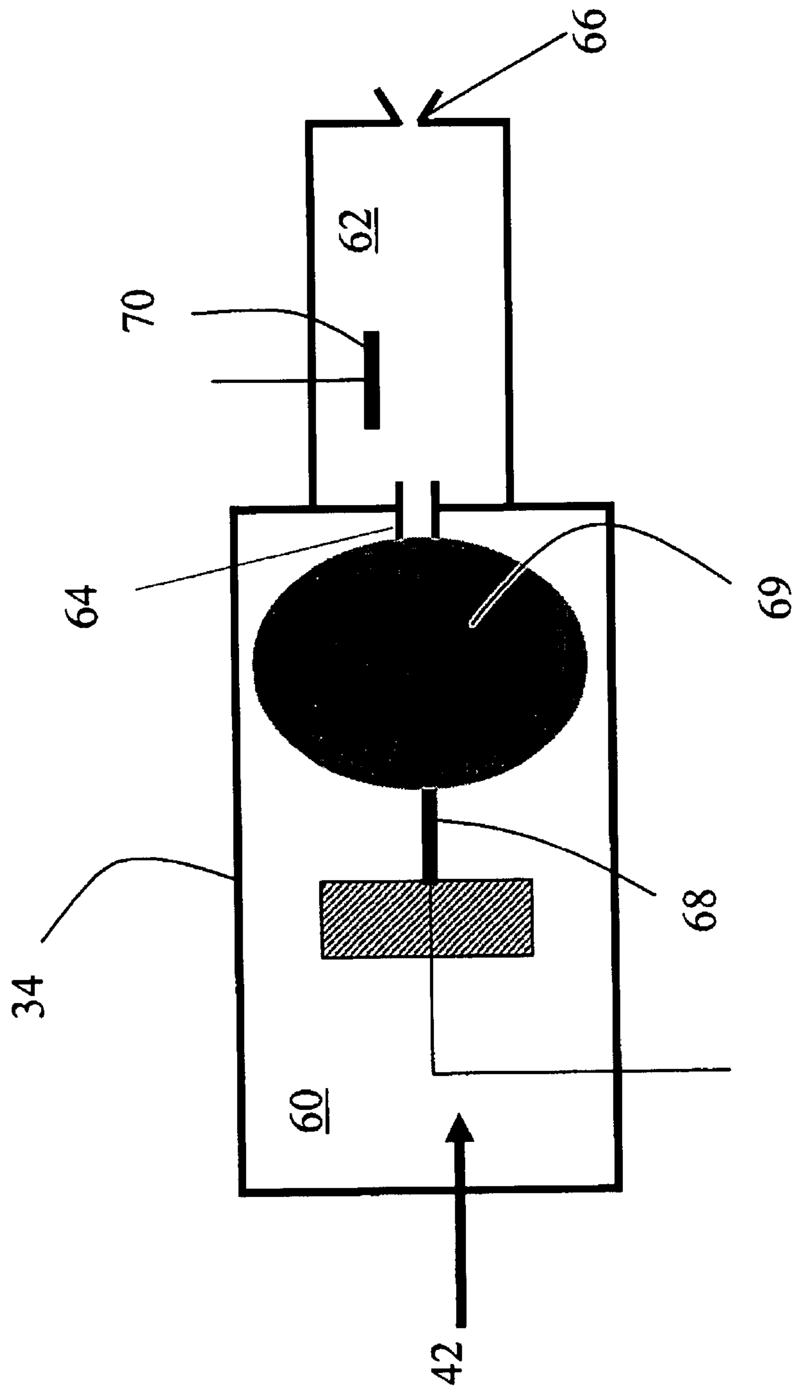
FIG. 2B is a schematic illustration of a metastable species source according to one embodiment of the present invention.

As shown in FIG. 2B, the metastable species source 34 can be for example a glow discharge chamber 60 operated typically at 10-100 Torr. A second chamber 62 is separated from the glow discharge chamber 60 by an aperture 64 and is differentially pumped for example to 100 mTorr. According to an embodiment of the present invention, an exit nozzle 66 can be located between the metastable species source 34 and mass spectrometer volume. Metastable species can be injected into a 1 mTorr pressure regime (as in a three-dimensional ion trap) or into a 10 mTorr pressure regime (as in ion guides). The comparatively high vacuum pressures of 1 mTorr and 10 mTorr impose less restrictions on nozzle diameter 66 that separate the gas discharge volume from the ion guides/ion trap volume. For example, nozzle diameters of 0.1 to 1 mm can be used for nozzle 66. Electrodes 68 and 70 drive the glow discharge. As shown, the electrode 70 is preferably, but not necessarily, placed off axis to collect charged species from the metastable flux.

As shown in FIG. 1 and FIG. 2B, the metastable species generator 34 can include an electrical discharge region 69 disposed apart from the interaction region between the quadrupole rods 20 and 22. As shown in FIG. 2B, an electrically biasable electrode (e.g., electrode 70) can be disposed in a vicinity of the electrical discharge region 69 and can collect charged species from the electrical discharge region 69 so as to reduce transport of the charged species from the exit nozzle 66 into the interaction region.

Other types of electrical discharges can be used, such as described, for example, in Yu. P. Raizer, (Gas Discharge Physics, Springer, Berlin, 1991), the entire contents of which are incorporated herein by reference. These discharges can include for example pulsed and non-pulsed electrical discharges. These discharges can include one of a microwave, an inductively coupled, a capacitively couple, a glow, or a corona discharge.

The metastable species source 34, according to an embodiment of the present invention, can generate approximately $10^{15}$ metastables/s/srad. Metastable species can effuse into lower pressure region of the ion guide with thermal velocities of the order of $10^4$ cm/s. For a characteristic distance of 1 cm, between the exit of the metastable species source and multiple ion guide central axis, this translates into concentration of metastable species on the axis of the ion guide on the order of $10^{11}$ metastables/cm$^3$. A typical gas kinetic cross section of biomolecules $\sigma$ is 100 Å$^2$ ($10^{-14}$ cm$^2$) or larger (Valentine, S. J., Counterman, A. E., Clemmer, D. E., J. Am. Soc. Mass Spectrom. 1999, 10: 1188-1211). A Penning ionization/fragmentation cross section $\sigma^*$ usually exceeds the gas kinetic cross section by one order of magnitude (Brunetti, B., et al, J. Phys. Chem. A 1997, 101: 7505-7512). Based on these values, according to an embodiment of the present invention, the effective length for the interaction with metastable species can take place as $1/n\sigma^* \sim 100$ cm, which corresponds to a time 1-10 ms (for the typical ion velocities). Certain ions need to spend that time in an ion guide or an ion trap in order to be fragmented via interaction with metastable species.

The metastable species generator can be configured to have a noble gas or an inorganic molecule supply, such as for example nitrogen, oxygen, carbon dioxide and others. The metastable species generator can be an electrical discharge operated, for example, at 10 mTorr to 100 mTorr, at 100 mTorr to 1 Torr, at 1 Torr to 10 Torr, or at 10 Torr to 100 Torr. Even higher pressures can be used, but perhaps at the cost of metastable species loss into the interaction region by restrictions associated with a small exit orifice 66.

As one example of a molecular species that can be dissociated according to the present invention, ions of biomolecules or other fragmentable molecules interact with metastable species. As used herein, biomolecules can describe any molecules of biological importance, including, but not limited to peptides, proteins, glycoproteins, DNAs, oligonucleotides, lipids and saccharides. By metastable species induced dissociation, a considerable improvement in MS/MS capability is realized over typical collisionally induced dissociation. Some of the increased capabilities of embodiments of the present invention include: (i) an increase of the mass range for tandem MS analysis; (ii) a simplification of the peptide sequencing process; (iii) a more reliable determination of posttranslational modifications, and (iv) high mass assignment accuracy for fragment ions.

In one embodiment of the present invention, the source of gas in the metastable species generator permits generation of a metastable species with a kinetic energy less than 0.1 eV, between 0.1 eV and 10 eV, and between 10 eV and 1000 eV. The design, that was described previously for introducing metastable species, expands the gas from for example the glow discharge region into a vacuum with thermal velocities, e.g. less than 0.1 eV. Another possibility, for example, is to create a beam of $Ar^+$ ions, accelerate the beam using electrostatic field for example to one of the corresponding energy levels described above, and then pass the accelerated ions through an electron cloud (retained for example by an electrostatic or a magnetic field). After capturing electrons, a high energy Ar neutral beam will contain metastable states of Ar, and can be injected into the interaction region.

In one embodiment of the present invention, the metastable species generator can be configured to control a duration of metastable species injection for example by controlling an on/off state of the metastable species generator as with a shutter (not shown) or by controlling a duration of an electrical discharge in the metastable species generator.

The exit orifice 66 of the metastable species source can be placed, for example, into the space between quadrupole rods (FIG. 2A). The expanding gas flow (into the lower pressure, about the quadrupole rods) can carry metastable species into the interior of the ion guide. Since the metastable species are neutral, the metastable species do not interact with rf field applied to the rods. The central part of this expanding flow can cross the central axis of the ion guide, where ions are confined by rf field. Some part of this expanding flow can hit the rods, and metastable species can be lost. However, according to an embodiment of the present invention, metastable species in the central part of the flow can remain intact and interact with ion beam.

Figure 3:
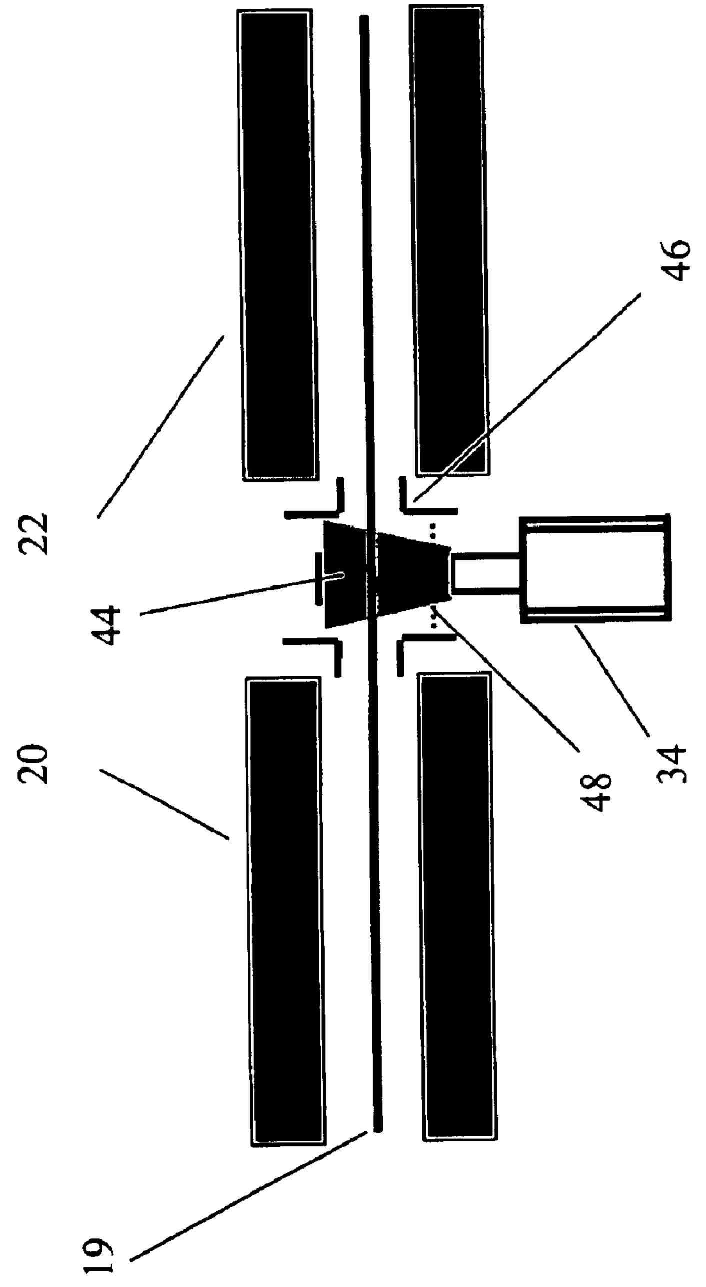
FIG. 3 is a schematic illustration showing another embodiment of the present invention where metastable species are introduced in a gap between two separate multipole ion guides.

In another embodiment of the present invention, the metastable species can be introduced in a gap between two separate multipole ion guides. In this embodiment, metastable species 44 are injected into a region between quadrupole 20 and quadrupole 22 where ion focusing optics 46 direct ions from quadrupole 20 and quadrupole 22, as depicted in FIG. 3. A transparent grid 48 is placed to form a symmetrical electric field distribution for the ion beam in this region.

Figure 4:
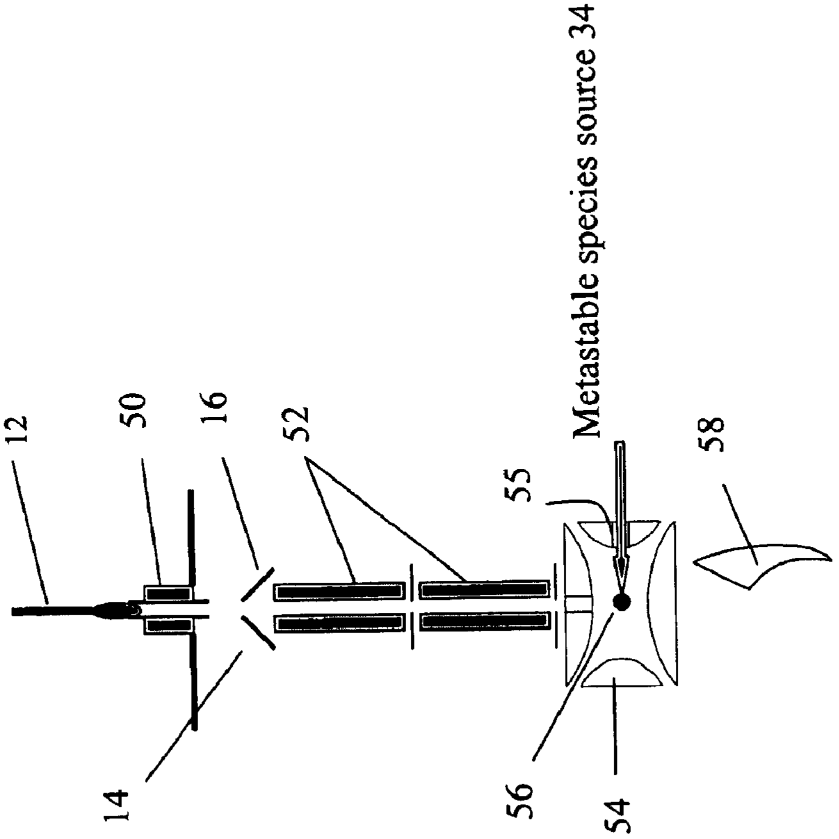
FIG. 4 is a schematic illustration showing another embodiment of the present invention for conducting tandem in time dissociation via interaction of selected ions with metastable species of low kinetic energy.

In another embodiment, as shown in FIG. 4, ions interact with metastable species in a tandem-in-time mass spectrometer (as described above where ion selection according to their mass to charge ratio and fragmentation is performed in the same location, but at different time). Ions generated in atmospheric pressure source 12 pass through heated capillary 50 into a differentially pumped region 14, maintained at a pressure of a few Torr, and then through a skimmer 16 into collimating multipole ion guides 52 operated in RF-only mode. Then a collimated ion beam can enter an ion trap 54, preferably a three-dimensional (3D) ion trap, where mass selection, fragmentation and mass analysis can take place. Fragmentation in this embodiment of present invention is caused by interaction of ion cloud 56, collected in the center of the ion trap 54, with a metastable species beam generated in the source 34. Ions and their fragments can be detected by an electron multiplier 58.

Numerous modifications and variations on the present invention are possible in light of the above teachings. It is, therefore, to be understood that within the scope of the accompanying claims, the invention may be practiced otherwise than as specifically described herein.

The invention claimed is:

1. An apparatus for mass analyzing molecules, comprising:

a mass spectrometer configured to select precursor ions having a mass to charge ratio range;

a metastable species generator configured to generate a metastable species for introduction into the mass spectrometer;

an interaction region in the mass spectrometer where the precursor ions are converted into product ions via interaction of the precursor ions with the metastable species; and a mass detector configured to detect a mass of the product ions, wherein said mass spectrometer comprises at least one of a three-dimensional ion trap, a linear ion trap, or an ion guide, said interaction region is located inside said three-dimensional ion trap or said linear trap or the ion guide, and at least one of said precursor ions or at least one of said product ions are excited by an alternating electric field or collisionally activated to produce additional productions.

2. The apparatus of claim 1, wherein the mass spectrometer is configured to select biomolecules having the mass to charge ratio.

3. The apparatus of claim 1, wherein the metastable species generator comprises:

an electrical discharge for generating atomic or molecular metastable species.

4. The apparatus of claim 3, wherein the electrical discharge comprises:

at least one of a microwave discharge, an inductively-coupled discharge, capacitively-coupled discharge, a glow discharge, or a corona discharge.

5. The apparatus of claim 3, wherein the electrical discharge comprises:

a pulsed electrical discharge.

6. The apparatus of claim 1, wherein the metastable species generator is configured to include a noble gas.

7. The apparatus of claim 1, wherein the metastable species generator is configured to include inorganic molecules.

8. The apparatus of claim 1, wherein the metastable species generator comprises an electrical discharge at 10 mTorr to 100 mTorr.

9. The apparatus of claim 1, wherein the metastable species generator comprises an electrical discharge at 100 mTorr to 1 Torr.

10. The apparatus of claim 1, wherein the metastable species generator comprises an electrical discharge at 1 Torr to 10 Torr.

11. The apparatus of claim 1, wherein the metastable species generator comprises an electrical discharge at 10 Torr to 1000 Torr.

12. The apparatus of claim 1, wherein the metastable species generator is configured to generate a metastable species with a kinetic energy less than 0.1 eV.

13. The apparatus of claim 1, wherein the metastable species generator is configured to generate a metastable species with a kinetic energy between 0.1 eV and 10 eV.

14. The apparatus of claim 1, wherein the metastable species generator is configured to generate a metastable species with a kinetic energy between 10 eV and 1000 eV.

15. The apparatus of claim 1, wherein the metastable species generator is configured to control a duration of metastable species injection.

16. The apparatus of claim 15, wherein the metastable species generator is configured to control an on/off state of the metastable species generator.

17. The apparatus of claim 15, wherein the metastable species generator is configured to control a duration of an electrical discharge in the metastable species generator.

18. The apparatus of claim 1, wherein:

the metastable species generator comprises an electrical discharge region disposed apart from the interaction region.

19. The apparatus of claim 18, further comprising:

an electrically biasable electrode disposed in a vicinity of the electrical discharge region and configured to collect charged species from the electrical discharge region so as to reduce transport of the charged species into the interaction region.

20. The apparatus of claim 19, wherein the electrically biased electrode is disposed off an axis between the electrical discharge region and the interaction region.

21. The apparatus of claim 1, wherein:

the ion guide comprises ion guide electrodes, and one of said ion guide electrodes have a slit for entry of the metastable species through the slit into the interaction region.

22. The apparatus of claim 21, wherein the ion guide electrodes comprise at least one of a set of poles or a set of plates.

23. The apparatus of claim 1, wherein:

the ion guide comprises ion guide electrodes extending in a longitudinal direction, and said ion guide electrodes have a spacing between adjacent ones of the ion guide electrodes for entry of the metastable species through the spacing between the longitudinally extending ion guide electrodes into the interaction region.

24. The apparatus of claim 23, wherein the ion guide electrodes comprise at least one of a set of poles or a set of plates.

25. The apparatus of claim 1, wherein:

the ion guide comprises at least two sets of ion guide electrodes extending in a longitudinal direction, and said at least two sets have a gap between adjacent sets of the ion guide electrodes for entry of the metastable species through the gap into the interaction region.

26. The apparatus of claim 25, wherein the at least two sets comprise a set of poles or a set of plates.

27. The apparatus of claim 1, further comprising:

a buffer gas device configured to add a buffer gas to the interaction region.

28. The apparatus of claim 1, further comprising:

an electron injection device configured to inject electrons into the interaction region.

29. The apparatus of claim 1, wherein:

the ion guide comprises ion guide electrodes, and the mass spectrometer is configured to trap at least one of the product ions and remaining of the precursor ions in said ion guide electrodes.

30. The apparatus of claim 29, wherein the mass spectrometer is configured to transmit at least one of the product ions and remaining of the precursor ions into the mass detector.

31. An apparatus for mass analyzing molecules, comprising:

a tandem mass spectrometer configured to select precursor ions having a mass to charge ratio range, said tandem mass spectrometer including, a mass selector configured to mass select a range of ion mass to transmit, and at least one set of ion guide electrodes configured to receive a transmitted ion from the mass selector;

a metastable species generator configured to generate a metastable species for introduction into the mass spectrometer;

an interaction region in the mass spectrometer where the precursor ions are converted into product ions via interaction of the precursor ions with the metastable species; and a mass detector configured to detect a mass of the product ions, wherein said interaction region is located inside said at least one set of ion guide electrodes.

32. The apparatus of claim 31, wherein at least one of said precursor ions or at least one of said product ions are excited by an alternating electric field to produce additional product ions.

33. The apparatus of claim 31, where said at least one set of ion guide is configured to operate as a collision cell.

34. The apparatus of claim 33, wherein at least one of said precursor ions or at least one of said product ions are collisionally activated in said collision cell to produce additional product ions.

35. The apparatus of claim 31, wherein the mass spectrometer is configured to trap at least one of the product ions and remaining of the precursor ions in said at least one set of ion guide electrodes.

36. The apparatus of claim 31, wherein the mass spectrometer is configured to transmit at least one of the product ions and remaining of the precursor ions from the tandem mass spectrometer into the mass detector.

37. The apparatus of claim 31, wherein the metastable species generator comprises:

an electrical discharge for generating atomic or molecular metastable species.

38. The apparatus of claim 37, wherein the electrical discharge comprises:

at least one of a microwave discharge, an inductively-coupled discharge, capacitively-coupled discharge, a glow discharge, or a corona discharge.

39. The apparatus of claim 37, wherein the electrical discharge comprises:

a pulsed electrical discharge.

40. The apparatus of claim 31, wherein the metastable species generator is configured to include a noble gas.

41. The apparatus of claim 31, wherein the metastable species generator is configured to include inorganic molecules.

42. The apparatus of claim 31, wherein the metastable species generator comprises an electrical discharge at 10 mTorr to 100 mTorr.

43. The apparatus of claim 31, wherein the metastable species generator comprises an electrical discharge at 100 mTorr to 1 Torr.

44. The apparatus of claim 31, wherein the metastable species generator comprises an electrical discharge at 1 Torr to 10 Torr.

45. The apparatus of claim 31, wherein the metastable species generator comprises an electrical discharge at 10 Torr to 1000 Torr.

46. The apparatus of claim 31, wherein the metastable species generator comprises an electrical discharge at sub atmospheric pressure.

47. The apparatus of claim 31, wherein the metastable species generator is configured to generate a metastable species with a kinetic energy less than 0.1 eV.

48. The apparatus of claim 31, wherein the metastable species generator is configured to generate a metastable species with a kinetic energy between 0.1 eV and 10 eV.

49. The apparatus of claim 31, wherein the metastable species generator is configured to generate a metastable species with a kinetic energy between 10 eV and 1000 eV.

50. The apparatus of claim 31, wherein the metastable species generator is configured to control a duration of metastable species injection.

51. The apparatus of claim 50, wherein the metastable species generator is configured to control an on/off state of the metastable species generator.

52. The apparatus of claim 51, wherein the metastable species generator is configured to control a duration of an electrical discharge in the metastable species generator.

53. The apparatus of claim 31, wherein:

the metastable species generator comprises an electrical discharge region disposed apart from the interaction region.

54. The apparatus of claim 53, further comprising:

an electrically biasable electrode disposed in a vicinity of the electrical discharge region and configured to collect charged species from the electrical discharge region so as to reduce transport of the charged species into the interaction region.

55. The apparatus of claim 54, wherein the electrically biased electrode is disposed off an axis between the electrical discharge region and the interaction region.

56. The apparatus of claim 31, wherein:

the mass spectrometer comprises ion guide electrodes, and one of said ion guide electrodes have a slit for entry of the metastable species through the slit into the interaction region.

57. The apparatus of claim 56, wherein the ion guide electrodes comprise at least one of a set of poles or a set of plates.

58. The apparatus of claim 31, wherein:

the mass spectrometer comprises ion guide electrodes extending in a longitudinal direction, and said ion guide electrodes have a spacing between adjacent ones of the ion guide electrodes for entry of the metastable species through the spacing between the longitudinally extending electrodes into the interaction region.

59. The apparatus of claim 58, wherein the ion guide electrodes comprise at least one of a set of poles or a set of plates.

60. The apparatus of claim 31, wherein:

the mass spectrometer comprises at least two sets of ion guide electrodes extending in a longitudinal direction, and said at least two sets have a gap between adjacent sets of the ion guide electrodes for entry of the metastable species through the gap into the interaction region.

61. The apparatus of claim 60, wherein the at least two sets comprise a set of poles or a set of plates.

* * * * *